May 16, 1939.  R. KIEWEG  2,158,545
PEACH PITTER
Filed Sept. 4, 1936 4 Sheets-Sheet 1
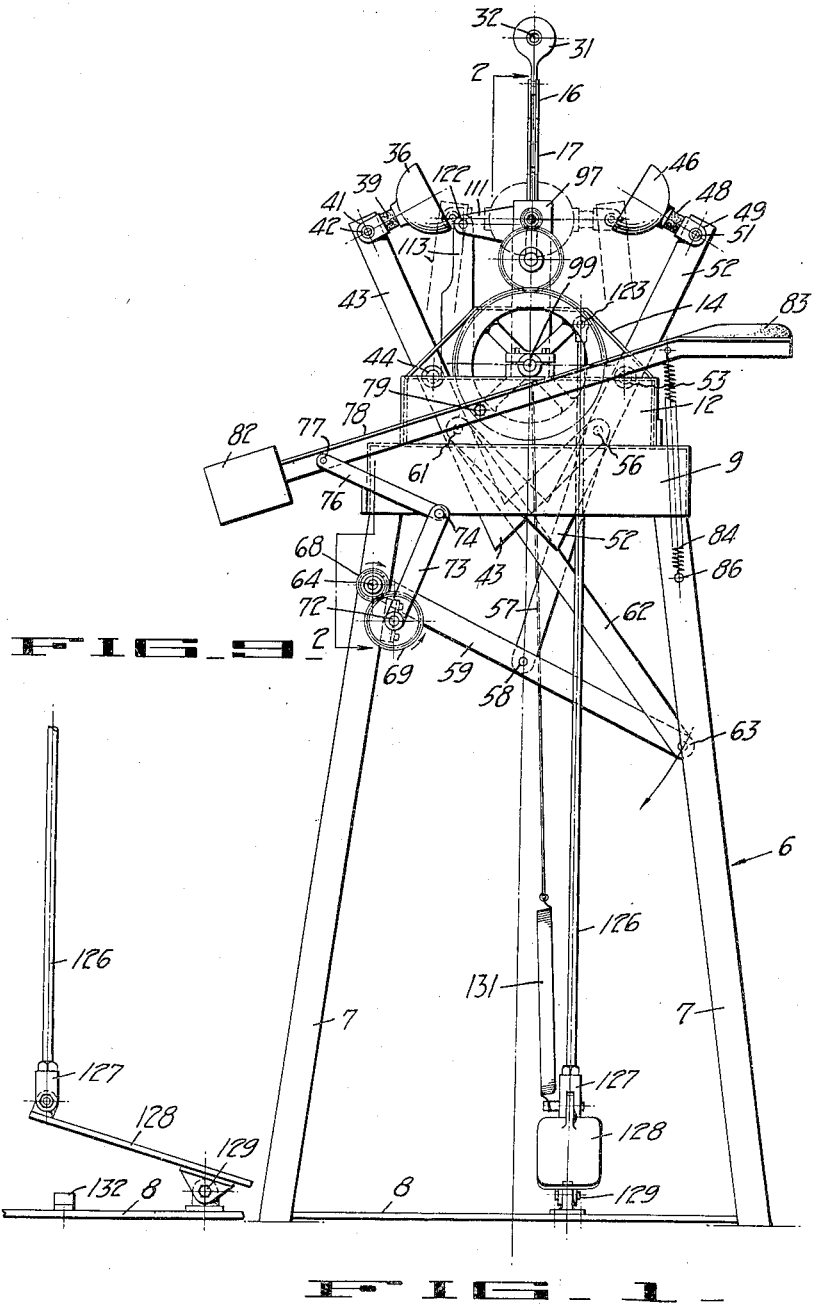
INVENTOR.
Rudolph Kieweg
BY Marcus Lothrop
ATTORNEY

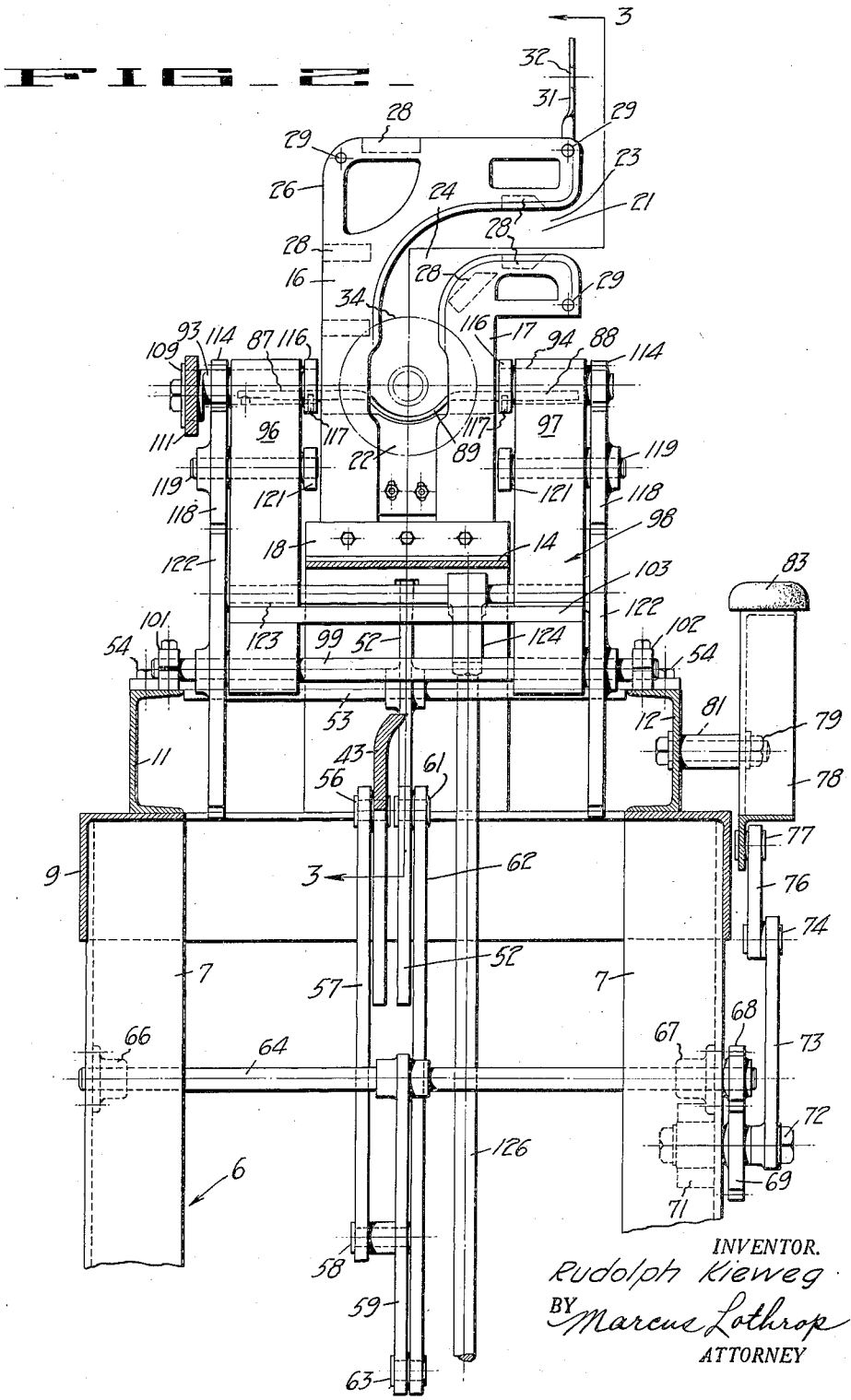

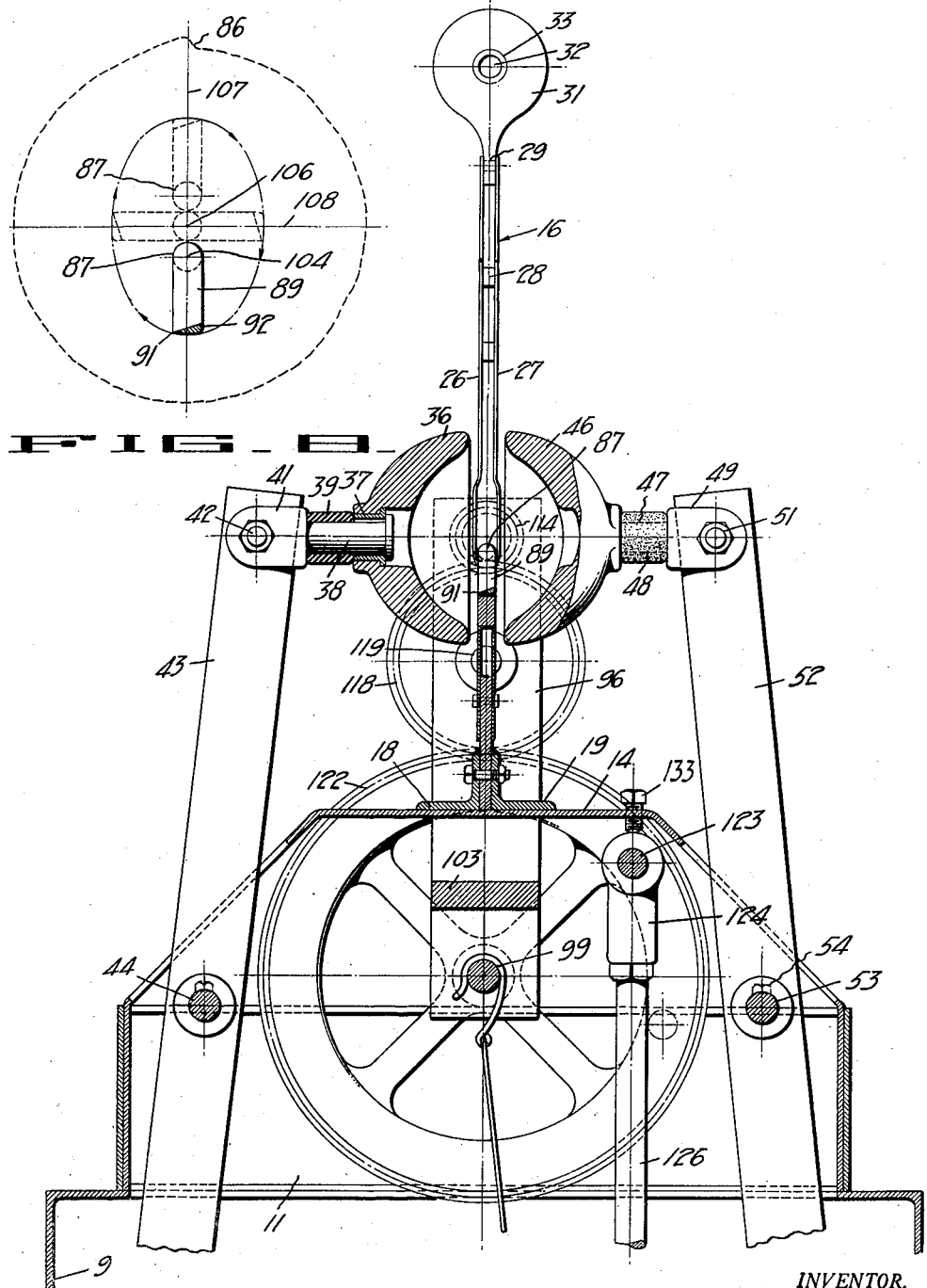

May 16, 1939.  R. KIEWEG  2,158,545
PEACH PITTER
Filed Sept. 4, 1936  4 Sheets-Sheet 4
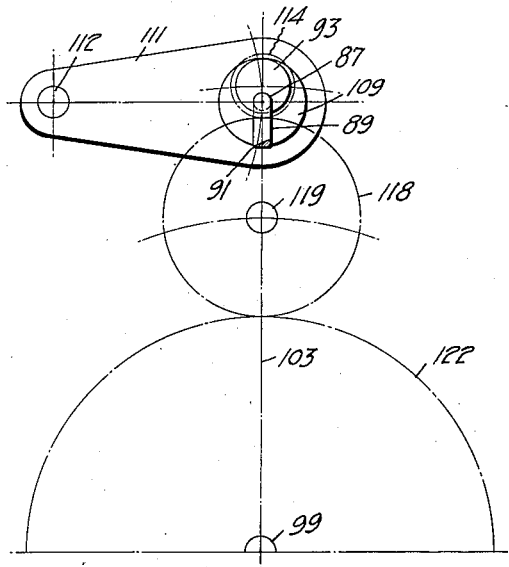
FIG_4_
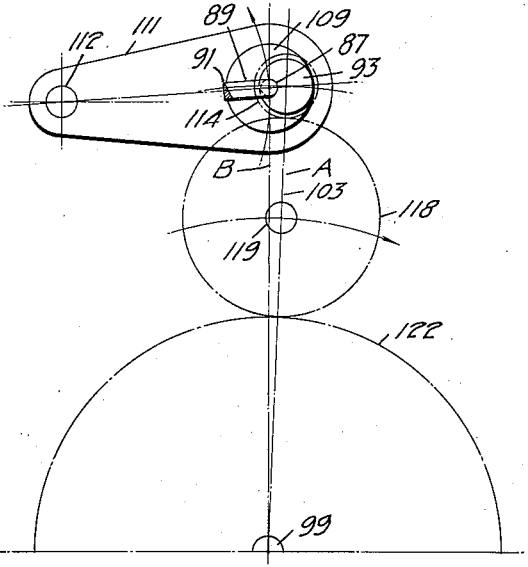
FIG_5_
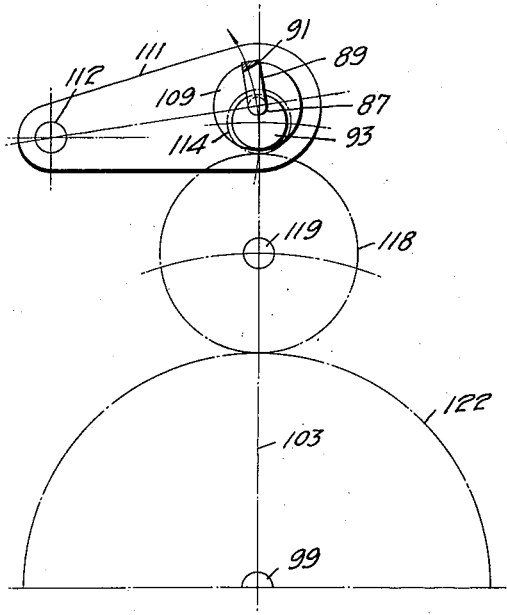
FIG_6_
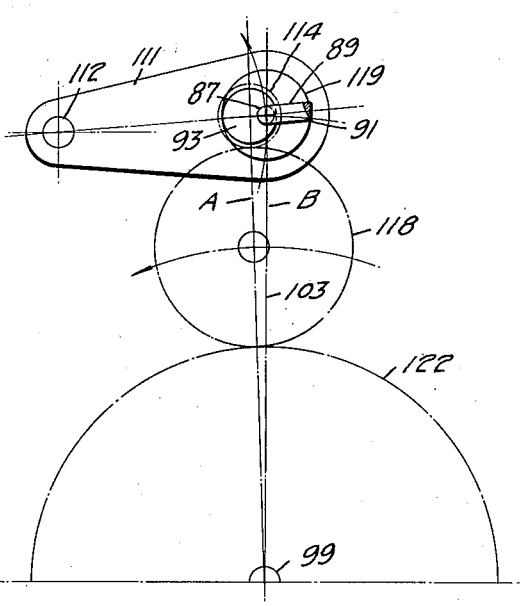
FIG_7_
INVENTOR.
Rudolph Kieweg
BY Marcus Lothrop
ATTORNEY Patented May 16, 1939

2,158,545

UNITED STATES PATENT OFFICE 2,158,545

PEACH PITTER

Rudolph Kieweg, Sacramento, Calif.

Application September 4, 1936, Serial No. 99,392

2 Claims. (Cl. 146—28)

My invention relates to means for cutting the pits from drupaceous fruits such as peaches, and is particularly concerned with a machine intended primarily for use in canneries for removing expeditiously the pit from the clingstone variety of peaches, which is the material usually processed in canneries. The usual clingstone peach utilized for canning purposes is a roughly approximate spherical body, at one pole marked by a stem-end depression or cavity and at the opposite pole characterized by a flower-end projection or tip. Extending generally as a meridian between the stem-end depression and the flower-end tip is a crease or groove, usually referred to as the suture. The suture on the exterior of the fruit marks and defines the plane of maximum cross-sectional area of the interior pit. The stem-end of the pit merges with the surface of the fruit at the base of the stem-end depresson but is otherwise materially and unequally spaced from the bounding surface of the fruit. The pit itself in cross-section on the plane of the suture is approximately oval in contour, and on a transverse plane at right angles to the first-mentioned plane of cross-section is likewise oval in contour but is considerably flatter or has a smaller minor axis. Many of the peaches offered to canneries for canning are entirely satisfactory for hand pitting but cause difficulty in mechanical pitting machines since the pits, instead of being integral and constituting one solid shell, have in the growing of the peach or otherwise become split and quite frangible; hence, when the peach flesh is cut to the pit, the split pit tends to come apart and loses its unitary identity. The pit in most varieties of canning peaches is immediately contacted and surrounded by a zone of reddish colored flesh which, while perfectly edible, is not desirable in canning since it gives a poor appearance to the canned peach half. It is therefore desirable to cut away sufficient of the peach flesh in removing the pit so as to remove also the reddish flesh portion.

It is therefore an object of my invention to provide a peach-pitting machine which will remove the pit from the peach despite difficulty occasioned by split pits.

Another object of my invention is to provide a peach-pitting machine in which the pit is severed from the peach flesh by a cut having a predetermined contour spaced from but approximately coinciding with the contour of the peach pit.

A further object of the invention is to provide a peach pitter in which the complete operation of pitting a peach and separating the pit from the severed peach halves is performed.

Another object of my invention is to provide a peach pitting machine of sufficient simplicity to be inexpensively built.

Still further object of my invention is in general to improve peach pitting machines.

The foregoing and other objects are attained in the embodiment of the invention illustrated in the drawings, in which—

Fig. 1 is a front elevation of a peach pitter constructed in accordance with my invention.

Fig. 2 is a cross-section the planes of which are indicated by the lines 2—2 of Fig. 1.

Fig. 3 is a cross-section the planes of which are indicated by the lines 3—3 of Fig. 2.

Fig. 4 is a diagrammatic cross-section showing the pitting blade in one position.

Fig. 5 is a figure similar to Fig. 4, showing the pitting blade in a successive position.

Fig. 6 is a figure similar to Fig. 5, showing the pitting blade in a next successive position.

Fig. 7 is a figure similar to Fig. 6, showing the blade in a further successive position.

Fig. 8 is a diagrammatic view indicating the path of the pitting blade with respect to a peach.

Fig. 9 is a detailed side elevation of the operating pedal of my peach pitter.

In its preferred form, the peach pitter of my invention includes means for holding an impaled peach with the suture in a predetermined position, together with a cutting means which follows a predetermined cycloidal path around the pit to sever the pit from the held peach.

In the form of peach pitter disclosed in the accompanying drawings, there is shown a machine which is adapted especially for use by a single operator handling one peach at a time. In this machine there is provided a framework, generally designated 6, incorporating a plurality of uprights 7 which at their lower extremities are fastened together by a bottom plate 8 and at their upper extremities are united by a flanged platform 9. Mounted on the platform are a pair of channels 11 and 12, while between them on the platform is an upwardly arched bridge plate 14.

Mounted on the bridge plate and extending upwardly therefrom are guides 16 and 17 each of which is a composite structure and both of which are held between angles 18 and 19. Together, the guides define a channel 21 which is L-shaped in contour and includes a vertical portion 22 and a horizontal portion 23 joined by a smoothly curved portion 24. The guides are preferably each composed of a pair of plates 26 and 27 held a uniform distance apart throughout most of their area by space blocks 28 and are fastened together by suitable fasteners 29. The facing edges of the members are preferably tapered to form knife edges of sufficient sharpness to sever peach flesh.

Clamped between the plates 16 and held by one of the fasteners 29 is a peach tipper 31, which includes a metal plate of annular aspect having a central aperture 32 with a sharpened knife edge 33. In the use of the machine, the machine operator holds a peach with the flower end toward the machine and with the suture in uppermost position, the stem end then being toward the operator. By a separate movement the tip of the peach is introduced into the aperture 32, and by a downward movement of the peach the tip is severed.

The peach is then lowered and advanced slightly and impaled on both of the guides 16 and 17, being first thrust forwardly into the horizontal portion 23 of the guideway 21. The peach is then continued around the curved portion 24 and downwardly in the vertical portion 22, but the peach is at no time rotated about a transverse horizontal axis, always being maintained with the stem end and the flower end in substantial, horizontal alignment. Due to the curvature of the path and the fact that the peach is not rotated, the sharp edges of the guides 16 and 17 cut the peach flesh all around the peach pit in a pair of closely spaced parallel planes. When the peach has been, by the operator's hands, pressed or advanced substantially into the broken-line position 34 of Fig. 2, it is released by the operator. At this general location in the channel 21, the transverse distance between the pairs of plates 26 and 27 is increased slightly, so that the peach flesh is spread apart slightly to be very firmly held in frictional engagement with the guides 16 and 17.

When the peach is in this position, I preferably provide means for holding it by its outside surface, instead of solely by the impaling blades. To this end I provide at one side of the machine a holding cup 36, generally of an approximate hemispherical contour, which is centrally apertured to receive a bushing 37. This bushing is a relatively loose fit on a pin 38, so that the cup 36 is freely movable within restricted limits on the pin but is normally held in extended, centralized position by a resilient collar 39 of rubber or comparable material surrounding the pin 38. A yoke 41 is preferably integral with the pin 38 and is held by a nut and bolt connection 42 with the upper extremity of an actuating lever 43 journaled at its fulcrum on a cross-shaft 44 flattened on both ends and fastened onto the channels 11 and 12. A similar fruit-holding cup 46 is arranged in opposition to the cup 36 and is similarly mounted on a stud 47 and held in place by a bushing 48 of resilient character. A yoke 49 on the stud 47 is held by a fastening 51 to the upper end of a lever 52 journaled at its fulcrum on a cross-shaft 53 secured by studs 54 to the channels 11 and 12.

Means are provided for simultaneously actuating the cups 36 and 46, and this is effected preferably by connections to the levers 43 and 52. The lever 43 at its terminus is connected by a pin 56 to a link 57, at its lower end connected by a pin 58 to a lever 59. Similarly, the lever 52 is joined by a pin 61 to a link 62 in turn connected by a pivot pin 63 to the extremity of the lever 59. The lever 59 is mounted to rotate with a cross-shaft 64 carried in journals 66 and 67 fastened on the uprights 7. One end of the shaft 64 is provided with a pinion 68 which meshes with a gear 69 journaled in a block 71 fastened to an upright 7.

The axle 72 of the gear 69 is fixed to a lever 73 which is connected by a pivot pin 74 to a link 76 in turn fastened by a pivot pin 77 to an operating lever 78. This lever is preferably pivoted adjacent its central point on a fulcrum pin 79 fastened to the channel 12 and is held in location by a spacing bushing 81. One end of the lever 78 carries a counterweight 82, while the other end has a hand grip 83 mounted thereon. In opposition to the counterweight 82 a coil spring 84 is attached at one end to the lever 78 and at the other end to a stud 86 on an upright 7. The spring is of such character that it is principally effective only during the uppermost travel of the hand grip 83 and acts as a cushion for the return movement thereof.

When the hand grip 83 is depressed from the position shown in Fig. 1, it lifts the counterweight 82 and causes the link 76 to rotate the lever 73 anti-clockwise, as seen in Fig. 1. This movement similarly rotates the gear 69 and causes clockwise rotation of the pinion 68. Such rotation of the shaft 64 causes the lever 59 to rotate and, through the links 57 and 62, to move the levers 43 and 52 about their respective fulcrums 44 and 53, and causes the cups 36 and 46 to approach each other. While these cups partake of substantially identical approaching movement, nevertheless their relatively loose mounting on their mounting studs 38, and the yielding character of the bushings 39 and 47, permit the cups to accommodate themselves to irregularities in the size and external surface of successive peaches. When the hand grip 83 is released by the operator, the counterweight 82 is effective to restore the cups substantially to their released position, as shown in Fig. 1, the end of such restoring movement being cushioned or checked by the spring 84.

In accordance with my invention I provide means for cutting the contained pit from a peach impaled on the guides 16 and 17 and retained by the cups 36 and 46. A peach in such location occupies approximately the position shown in Fig. 8, with the suture or crease 86 of the peach uppermost and occupying substantially the central plane of the machine and of the guides 16 and 17. Passing between the plates 26 and 27, preferably in their somewhat widened portion, are the shaft ends 87 and 88 of a cutting knife having a central loop 89 provided with a cutting edge 91 and a somewhat thicker back 92. A cross-section of the knife in its cutting portion and throughout the loop is substantially triangular, as shown in Fig. 8, whereas the shaft ends 87 and 88 are substantially circular in cross-section. They are in alignment on the same axis and preferably are mounted in rotary bushings 93 and 94, respectively.

Each bushing is mounted to rotate in its respective upright member 96 and 97 of an oscillating frame, generally designated 98, mounted to rock on a cross-shaft 99 journaled in blocks 101 and 102 on the channels 11 and 12, respectively. The uprights 96 and 97 comprised in the frame are connected as a unit by a cross-strap 103 passing beneath the bridge 14. The bushings 93 and 94 are freely journaled in the uprights 96 and 97 but rotate about a common axis which is displaced from the axis of the knife ends 87 and 88 but substantially coincides with the central axis of the peach. In the position particularly shown in Fig. 8 and in Fig. 2, the knife axis 104 is displaced from the central axis 106 of the peach. The central vertical plane is illustrated by the line 107, and a horizontal plane of approximate symmetry is illustrated by the broken line 108. The bushing 93 is preferably terminated by an eccentric 109, the center of which substantially coincides with the axis 104 of the shaft ends 87 and 88. Thus, the knife shaft axis 104 and the axis of the eccentric 109 are substantially identical and consequently are displaced equivalent amounts from the axis of rotation 106 of the bushings 93 and 94. The eccentric 109 is confined in an eccentric strap 111 connected by a pivot pin 112 to a stationary upright 113 mounted on the channel 11.

Means are provided for imparting suitable rotary motion to the bushings 93 and 94 in order to rotate the knife and give it the desired motion. Each of the bushings 93 and 94 is provided with a pinion 114 fixed on the bushing and which has a hub extension to bear against the respective upright 96 or 97. Collars 116 bear against the other side of the uprights 96 and 97 to hold the bushings in axially confined location, and the collars themselves are held by set screws 117 which pass entirely therethrough and engage flats on the knife shaft ends 87 and 88. The set screws thus not only hold the knives in location but hold the bushing and gear assembly in place. When the set-screws 117 are withdrawn, the bushings 93 and 94 can both be withdrawn from their respective uprights 96 and 97 and the knife 89 can be withdrawn through the aperture in the upright 97, for example, remaining after the extraction of the bushing 94.

Meshing with the pinions 114 are idler gears 118, each mounted on a spindle 119 journaled in the uprights 96 and 97 and retained by collars 121, and in turn meshing with drive gears 122. The gears 122 are freely journaled on the cross-shaft 99 but are fastened together for rotation in unison by a tie rod 123 rigidly secured at opposite ends to the flange of each of the gears 122. Journaled on the tie rod 123 is a driving body 124 connected by a link 126 and a pivot connector 127 to an operating treadle 128. This treadle is connected by a pivot mounting 129 to the base plate 8. A coil spring 131 urges the treadle 128 into uppermost position, while a stop 132 limits the downward movement of the treadle. A stop 133 on the bridge 14 adjustably limits the upward movement of the treadle.

When the treadle 128 is depressed, against the urgency of the spring 131, into contact with the stop 132, the rod 126 is lowered and, through the tie rod 123, the drive gears 122 are simultaneously rotated. They rotate their idler gears 118 and simultaneously rotate the pinions 114. The bushings 93 and 94 are simultaneously rotated and, if there were no other mechanism, the knife edge 91 would traverse a circular path. But the eccentric 109 is connected by its strap 111 to a stationary part 113 of the frame 6, and the rocking frame 103 is free to oscillate about the same axle 99 as the gears 122 rotate on. Hence, the knife has a planetary movement and the cutting edge of the knife 91 follows a cycloidal path. The cycloidal path is a special case in which the eccentricity of the eccentric 109 and the offset of the axis 104 from the axis 106 are in such phase and are of such magnitude that the cutting edge 91 follows substantially an elliptical path as well, with the center 104 of the shaft travelling substantially vertically to coincide with the plane 107, as illustrated in Figs. 4 to 8 inclusive.

When the cutting edge 91 starts its movement, it is substantially in the position shown in Fig. 4, and the oscillating frame 103 is substantially vertical. When the pinions 114 have rotated approximately 90 degrees, however, the cutting edge 91 is in substantially the position shown in Fig. 5 and the oscillating frame 103 has its general plane displaced a maximum amount from the central axis and the plane A of the oscillating frame 103 has been displaced a maximum amount from the central symmetrical plane B of the machine. When the pinions 114 have gone through a successive 90-degree rotation, the cutting edge 91 is substantially in the position shown in Fig. 6, and the plane A of the oscillating frame 103 and the plane B of the general machine are again in coincidence. The next 90-degree rotation of the pins 114 moves the cutting edge 91 substantially into the position shown in Fig. 7, in which the plane A of the oscillating frame has been displaced a maximum amount from the plane B of the machine but in the opposite direction to that of Fig. 5. A final 90-degree rotation of the pinions 114 restores the mechanism to the position shown in Fig. 4.

The cutting edge 91 follows what is, strictly speaking, a cycloidal path, but in the present instance is a special case of a cycloidal path in that it is approximately an ellipse almost exactly an envelope for the peach pit. The knife edge does not depend upon the contour of the pit to establish its cutting path, however, but cuts a predetermined path some distance from the pit in order to remove a film of flesh with the pit. This film is usually of reddish color, and is commercially deleterious and best removed. Furthermore, since the knife in no wise contacts with the pit, it is immaterial whether or not the pit is split; hence this machine operates equally well with split pit and whole pit peaches.

When the knife has completed a revolution and has returned substantially to its original position, the pit has been entirely severed from both of the peach halves and from the small central slice occupying the position between the space plates 26 and 27. At this juncture the treadle 128 is released by the operator and is returned under the urgency of the spring 131. The hand grip 83 is no longer held down but is released. The cups 36 and 46 are therefore released to discharge the two halves of the pitted peach, the pit falls out during the return rotation of the cutting edge 91, and the removed slice or portions of the peach flesh between the plates 26 and 27 are subsequently crowded out by later pitted peaches and by the space blocks 28.

I claim:
1. A peach pitter comprising a frame, a pair of cups movably mounted on said frame for holding a peach, a shaft journaled on said frame, means for oscillating said shaft through a partial revolution only, a sub-frame mounted on said shaft for oscillation about the axis thereof, a pair of spaced bushings rotatably mounted in said sub-frame with their common axis parallel to the axis of said shaft, a pitting knife mounted in said bushings with the axis of said knife eccentric to the axis of said bushings for pitting said held peach, means for moving said cups, means on said shaft and connected to said bushings for rotating said bushings through a com- plete revolution, and means for oscillating said sub-frame in time with the rotation of said bushings.

2. A peach pitter comprising a frame, a pair of opposed cups movably mounted on said frame for holding a peach to be pitted, a shaft journaled on said frame, means for oscillating said shaft through a partial revolution only, a sub-frame mounted on said shaft for oscillation about the axis thereof, a pair of spaced bushings rotatably mounted in said sub-frame with their common axis parallel to the axis of said shaft, an eccentric on one of said bushings, an eccentric strap on said eccentric and pivoted on said frame, a pitting knife mounted in said bushings with the axis of said knife eccentric to the axis of said bushings for pitting said held peach, means for moving said cups, and means on said shaft and connected to said bushings for rotating said bushings and said eccentric through a complete revolutions.

RUDOLPH KIEWEG.